US006938657B1

United States Patent
Cucco et al.

(12)

(10) Patent No.: US 6,938,657 B1
(45) Date of Patent: Sep. 6, 2005

(54) TIRE FOR A VEHICLE WHEEL CAPABLE OF WITHSTANDING THE LOAD AT LOW PRESSURE OR ZERO PRESSURE

(75) Inventors: Gian Carlo Cucco, Milan (IT); Piero Misani, Milan (IT); Alessandro Volpi, Milan (IT); Guido Riva, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 269 days.

(21) Appl. No.: 09/633,898

(22) Filed: Aug. 7, 2000

Related U.S. Application Data (60) Provisional application No. 60/153,681, filed on Sep. 14, 1999.

(30) Foreign Application Priority Data

Aug. 5, 1999 (EP) .................................. 99202572

(51) Int. Cl.[7] .................. B60C 17/00; B60C 15/00; B60C 9/00; B60C 9/18; B60C 9/26
(52) U.S. Cl. ................ 152/200; 152/197; 152/516; 152/517; 152/526; 152/528; 152/532; 152/552; 152/554; 152/555
(58) Field of Search ................ 152/196–198, 152/200, 516, 526, 528, 517, 555, 540, 552, 152/554, 532

(56) References Cited

U.S. PATENT DOCUMENTS

| | | | | |
|---|---|---|---|---|
| 1,503,883 | A | * | 8/1924 | Cobb .................... 152/540 X |
| 2,305,819 | A | * | 12/1942 | Vorwerk .................... 152/528 |
| 3,237,674 | A | * | 3/1966 | Budd et al. .................... 152/540 |
| 3,708,007 | A | | 1/1973 | Roberts |
| 3,734,157 | A | | 5/1973 | Roque |
| 3,831,657 | A | | 8/1974 | Dillenschneider |
| 4,111,249 | A | | 9/1978 | Markow |
| 4,168,732 | A | * | 9/1979 | Monzini .................... 152/526 X |
| 4,307,767 | A | | 12/1981 | Calori |
| 4,428,411 | A | | 1/1984 | Markow et al. |
| 4,459,169 | A | | 7/1984 | Bacehowski et al. |

(Continued)

FOREIGN PATENT DOCUMENTS

AU 286945 * 10/1965 .................... 152/526

(Continued)

OTHER PUBLICATIONS

G.R. Zadno et al., "Linear Superelasticity in Cold-Worked Ni-Ti", *Engineering Aspects of Shape Memory Alloys*,. CM Wayman Ed., Butterworth-Heinemann Publishers, pp. 414-419, (1990).

(Continued)

*Primary Examiner*—Adrienne C. Johnstone
(74) *Attorney, Agent, or Firm*—Finnegan, Henderson, Farabow, Garrett & Dunner, L.L.P.

(57) ABSTRACT

A tire for a vehicle wheel, capable of withstanding the load at low pressure or zero pressure, includes a carcass, a crown, two axially opposed sidewalls, two bead cores, two compression-resistant annular reinforcing elements, and, optionally, a belt structure. The annular reinforcing elements are made of material having high rigidity and very low elastic hysteresis. Each annular reinforcing element is in or adjacent to a zone joining the crown to a sidewall and in a first plane parallel to an equatorial plane of the tire. Each bead core is in a second plane parallel to the equatorial plane. The distance between the first planes is greater than or equal to the distance between the second planes. A camber of an arc between a bead core and an intersection of a carcass ply line with a cylindrical surface passing through the reinforcing elements does not exceed 15% of the arc length.

17 Claims, 4 Drawing Sheets

U.S. PATENT DOCUMENTS

| | | | |
|---|---|---|---|
| 4,673,014 A | 6/1987 | Markow | |
| 5,238,040 A | 8/1993 | Ghilardi | |
| 5,685,927 A | 11/1997 | Hammond et al. | |

FOREIGN PATENT DOCUMENTS

| | | | |
|---|---|---|---|
| EP | 0 249 135 A2 | 12/1987 | |
| FR | 1.174.970 | 3/1959 | |
| JP | 58093607 A * | 6/1983 | ................ 152/526 |

OTHER PUBLICATIONS

T.W. Duerig et al., "An Engineer's Perspective of Pseudoelasticity", *Engineering Aspects of Shape Memory Alloys*, CM Wayman Ed., Butterworth-Heinemann Publishers, pp. 369-393, (1990).

G. Lubin, "Filament Winding", *Handbook of Fiberglass and Advanced Plastics Composites*, Van Nostrand Reinhold Company, pp. 439-444, (1969).

* cited by examiner

TIRE FOR A VEHICLE WHEEL CAPABLE OF WITHSTANDING THE LOAD AT LOW PRESSURE OR ZERO PRESSURE

Applicants claim the right of priority under 35 U.S.C. § 119(e) based on prior-field copending provisional application No. 60/153,681, filed Sep. 14, 1999, in the U.S. Patent and Trademark Office.

BACKGROUND OF THE INVENTION

1. Field of the Invention

The present invention relates motor vehicle wheels which is capable of withstanding the load even at low or zero pressure.

2. Description of the Related Art

It is well known that, since tyres were first developed, a large number of solutions have been proposed in an attempt to solve the problem relating to travel of said tyres in a deflated or—to use the technical term—"flat" condition. In fact this problem is important not only in the event of punctures during normal travel, but also with regard to military vehicles and therefore punctures caused for example by bullets.

Without mentioning, for the sake of brevity, the proposed solutions based on the use of sealants of various types, mechanical devices which must be mounted on the rims, special rims, sponge-like inserts, etc., it is sufficient to consider the structures of tyres which are self-supporting, namely are able to withstand the load even under zero inflation pressure, in order to find in the prior art a large number of solutions which, however, hitherto have not produced satisfactory results.

In this connection it should be stated first of all that, in a tyre traveling in a straight line, the only element which is subject to compression is the air contained inside it, whereas the tyre as a whole may be regarded as a tensile structure, i.e., in which all the structural elements which support loads work under tension.

In the case of a tyre, compressive stress is understood as meaning a stressed state such that the hydrostatic component of the tensor of the forces and the tensor of the deformations has a negative value.

It is obvious that when there is no internal-air pressure, if the structure is to continue withstanding the load applied, it must necessarily comprise elements which work under compression.

In general these elements, when they are made of elastomer material, involve not only an obvious increase in the weight of the tyre, but also an appreciable increase in the absorption of power due to elastic hysteresis and therefore in the rolling resistance of the tyre and its working temperature.

Among the solutions of the known art which can be associated with this approach, the following may be mentioned:

U.S. Pat. No. 5,238,040 envisages a structure of the tyre sidewall which includes three lens-shaped inserts, in addition to the reinforcing cords which are subject to tractional stress. The inserts in question are subject to complex stressed states which include a negative hydrostatic component or compressive component.

The rolling resistance of this tyre, although being less than that of other tyres which are based on the same principle (for example consisting of a single lens-shaped element reinforcing the sidewalls of the tyre), remains appreciably greater than the rolling resistance which is typical of normal tyres.

U.S. Pat. No. 3,708,007 describes a tyre containing two annular reinforcing elements which are inserted in the fold of a belt layer and which have the function of improving the performance of the tyre during driving of the vehicle. From the description and from the drawings it may be understood that the two annular elements are associated with a traditional geometry of the tyre, so that "flat travel" cannot be ensured and moreover is not mentioned even hypothetically in the text of this patent.

A structure comprising two cords, which in this case also are inserted at each end of the belt in a fold thereof, is described and illustrated in U.S. Pat. No. 3,831,657. The two cords in question do not have a structural function, but only that of facilitating folding of the ends of the belt during the tyre manufacturing process, as moreover confirmed by the suggested use of two nylon cords, which are entirely incapable of withstanding compressive forces and also very ineffective when subjected to tractional forces.

The tyre described and illustrated in U.S. Pat. No. 4,307,767 is specifically intended for travel at zero pressure and has two sidewalls which are devoid of a textile reinforcement and have an inverted curvature, namely a concave external surface and convex internal surface, so that they work exclusively under compression in any travel condition and therefore both during normal travel and during "flat travel", namely at zero internal pressure.

Between the sidewall and crown of the tyre, owing to the specific curvature of the sidewalls, an imperfect hinge is formed, said hinge, when subject to the flexural forces of normal travel, giving rise to the risk of rupture due to fatigue. For this reason the tyre has two annular reinforcing elements consisting of two metal bead cores which are located in the shoulders of the tyre and are capable of imparting radial rigidity, under compression, to the structure of the sidewalls.

In the event of flat travel, the contribution in terms of rigidity which can be attributed to annular reinforcing elements of this kind is marginal compared to the contribution offered by the compressive resistance of the sidewalls.

In short the tyre described in this prior patent bases its load-bearing capacity on the compression of the sidewalls, both when the tyre is inflated and during flat travel.

U.S. Pat. No. 5,685,927, specifically relating to flat travel, describes a composite reinforcing structure which envisages, on the one hand, a plurality of elastomer inserts which are situated in the side and, on the other hand, at least one bead wire passing along the middle plane between the carcass plies and the tread band. This consists of a complex structure with a high manufacturing cost.

An alternative solution, which is envisaged in many prior patents, is that consisting in an annular structure reinforcing the crown of the tyre (as, for example, in U.S. Pat. Nos. 3,734,157, 4,111,249, 4,428,411, 4,459,169, and 4,673,014), a structure which occupies substantially the entire width of the tread band and reinforces flexurally the belt structure. In the case of the solutions proposed in the past with regard to self-supporting structures suitable for flat travel and involving the presence of elastomer structural elements, intense overheating occurs both during normal travel and, even more so, during flat travel.

This overheating in turn causes thermal/oxidative degradation of the materials, in particular the elastomer structural elements, and the consequent defects.

Moreover, in order to ensure the load-bearing capacity during flat travel, hitherto it has been considered indispensable to use bending-resistant or compression-resistant elements, attaching less importance to or even ignoring the thermo-chemical aspects and the problems associated therewith.

Although alternative solutions (previously mentioned) are known where the entire periphery of the tyre is reinforced and overheating is limited, the performance and comfort as well as duration of the tyre are greatly affected as a result during normal travel.

SUMMARY OF THE INVENTION

The present invention aims to solve the problem of flat travel of a tyre, while essentially avoiding all the problems associated with the known solutions.

More specifically the present invention aims to provide a tyre suitable for flat travel classifiable in the category of tyres provided with structural reinforcing elements associated with the sidewalls of the tyre, so as to ensure a satisfactory performance in terms of behaviour, travel comfort and structural duration of the tyre, avoiding at the same time the risk of serious overheating and therefore thermo-chemical degradation of the tyres.

According to a first aspect thereof, the invention relates to a tyre for vehicle wheels, capable of withstanding the load even under low pressure or zero pressure, characterized by two compression-resistant annular elements which are made of material having a high rigidity and very low elastic hysteresis, in particular metallic materials or structural composite materials, said annular elements being housed in the buttress, namely in or adjacent to the zone joining together the crown and the sidewalls of the tyre, located in planes parallel to the equatorial plane of the tyre and arranged at a distance not less than the distance between the planes in which the normal bead cores lie, the sidewalls of the tyre having a high radius of curvature such that the camber is not greater than 15% of the length of the carcass arc lying between the bead wire and the corresponding annular reinforcing element.

As may be understood from the detailed description of the preferred embodiments, the two structural elements form the load-bearing support of the tensile structure when there is no inflation pressure and, moreover, although being mainly subject to a compressive stress during flat travel, their composition (being made of metal or of a structural composite material as defined below) results in a negligible dissipation of energy.

In other words the known technology envisages using, for flat travel, the flexural strength of a reinforced sidewall in order to support the load. More specifically the mechanism by means of which the structure consisting of the assembly of the carcass plies and the annular elastomer reinforcing elements co-operating with the plies supports the load acting on the sidewall consists in the fact that the reinforcing element, being subject to a compressive stress, undergoes a consequent deformation which in turn tensions the cords of the carcass plies.

The present invention, on the other hand, makes use of the capacity of the carcass cords to withstand tensile loads in order to transmit the compressive forces onto the two annular reinforcing elements made of the abovementioned material.

As is well known to persons skilled in the art, in the flat travel condition, namely when the tyre is deflated, the contact between the flange of the wheel rim and the road surface results in loss of control of the vehicle by the driver, as occurs in conventional tyres with sidewalls devoid of elastomer reinforcing elements, owing to excessive flexing of the sidewall, i.e. deflection of the tyre.

In the present invention this deflection is prevented by the presence of the two high-rigidity annular reinforcing elements made of metallic materials or similar composite materials, since said deflection would result in elongation of the carcass cords in the top half of the tyre, an elongation which is not permitted by the capacity of the carcass cords to withstand tensile loads. These tensile loads are transformed into a compressive force generated within and withstood by the abovementioned annular reinforcing elements.

This effect, moreover, is increased if the meridian curvature of the carcass ply line is kept as small as possible, since a high curvature of this profile would result in an increase in the flexing of the tyre for the same load during flat travel.

The smaller curvature of the ply line results in a greater lateral rigidity of the structure and therefore produces improved slip-angle characteristics under zero inflation pressure. The abovementioned characteristic features of the present invention also include the distance between the planes of the two structural reinforcing elements.

Indeed, this distance influences the performance of the tyre during flat travel in relation to the lateral thrusts, since, if the width of the belt is increased, thus positioning the two structural reinforcing elements at a considerable distance from each other, this performance improves.

This result appears to be guaranteed if this distance is substantially greater than the distance between the planes in which the normal bead cores lie, i.e. at least more than 105% and preferably not less than 110% the distance between the said bead cores.

BRIEF DESCRIPTION OF THE DRAWINGS

The features and advantages of the present invention will appear more clearly from the following description of a few embodiments of the invention, provided with reference to the accompanying drawings, in which.

DETAILED DESCRIPTION OF THE EXEMPLARY EMBODIMENTS

The tyre comprises a carcass 10, a tread band 12 which is located on the periphery of said carcass, a pair of sidewalls 14 which are axially opposite to each other and terminate in beads 16 reinforced by bead cores 18 and associated bead-filling elements 20, for securing said tyre onto a corresponding mounting rim. In the case of a radial carcass, the tyre also comprises a belt structure which is arranged between the carcass and tread band. More preferably, the tyre is of the type with a cross-section of low aspect ratio, for example, between 0.70 and 0.30, and even more preferably less than 0.65.

The carcass is reinforced in a traditional manner with one or more carcass plies 22 which are secured to said bead cores, while the belt structure comprises two or more belt strips 24 which are formed by sections of rubberised fabric incorporating metal cords, parallel with each other in each strip and intersecting with those of the adjacent strips, inclined preferably in a symmetrical manner with respect to the equatorial plane and radially superimposed on each other. Preferably, in a manner which is also known, a further belt strip 26 is also provided in a radially more external position, being provided with cords, preferably made of textile material or even more preferably of heat-shrinkable material, and oriented circumferentially, i.e. at zero degrees with respect to the abovementioned equatorial plane.

Figure 3:
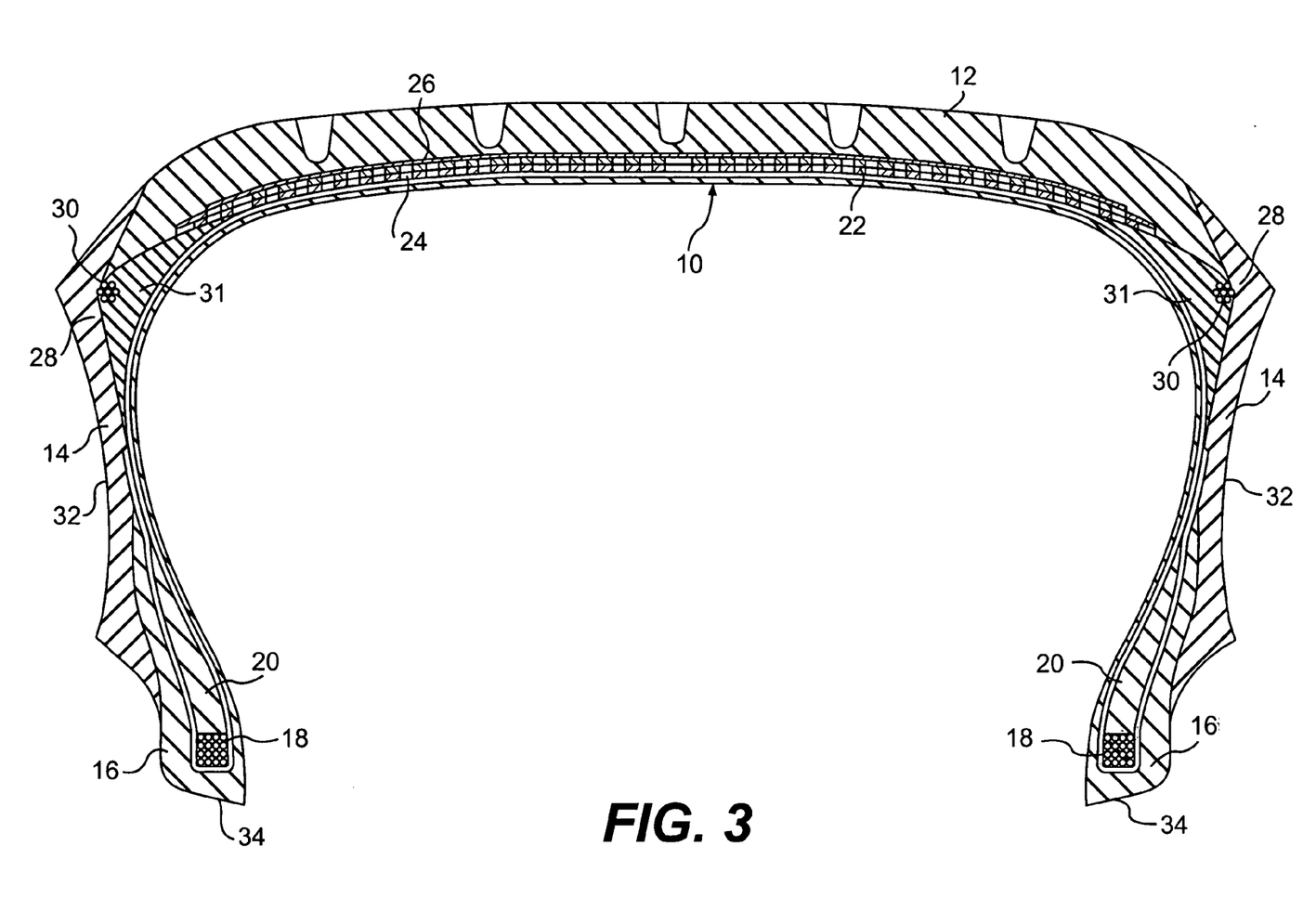

With reference in particular to FIG. 3, this figure shows the simplest constructional design of the tyre according to the invention in which the buttress 28 incorporates the annular reinforcing element 30 which in the case shown consists in a seven-turn wound arrangement of a normal metal wire for bead cores, optionally rubberised, for example with a diameter of 1.6 mm.

A shoulder insert, preferably consisting of filling rubber and indicated by the reference number 31, is associated with the reinforcing element 30. Said insert consists of a composition which is not particularly hard and optionally formed as one piece with the element 30 by means of moulding (for example injection-moulding).

Figure 4:
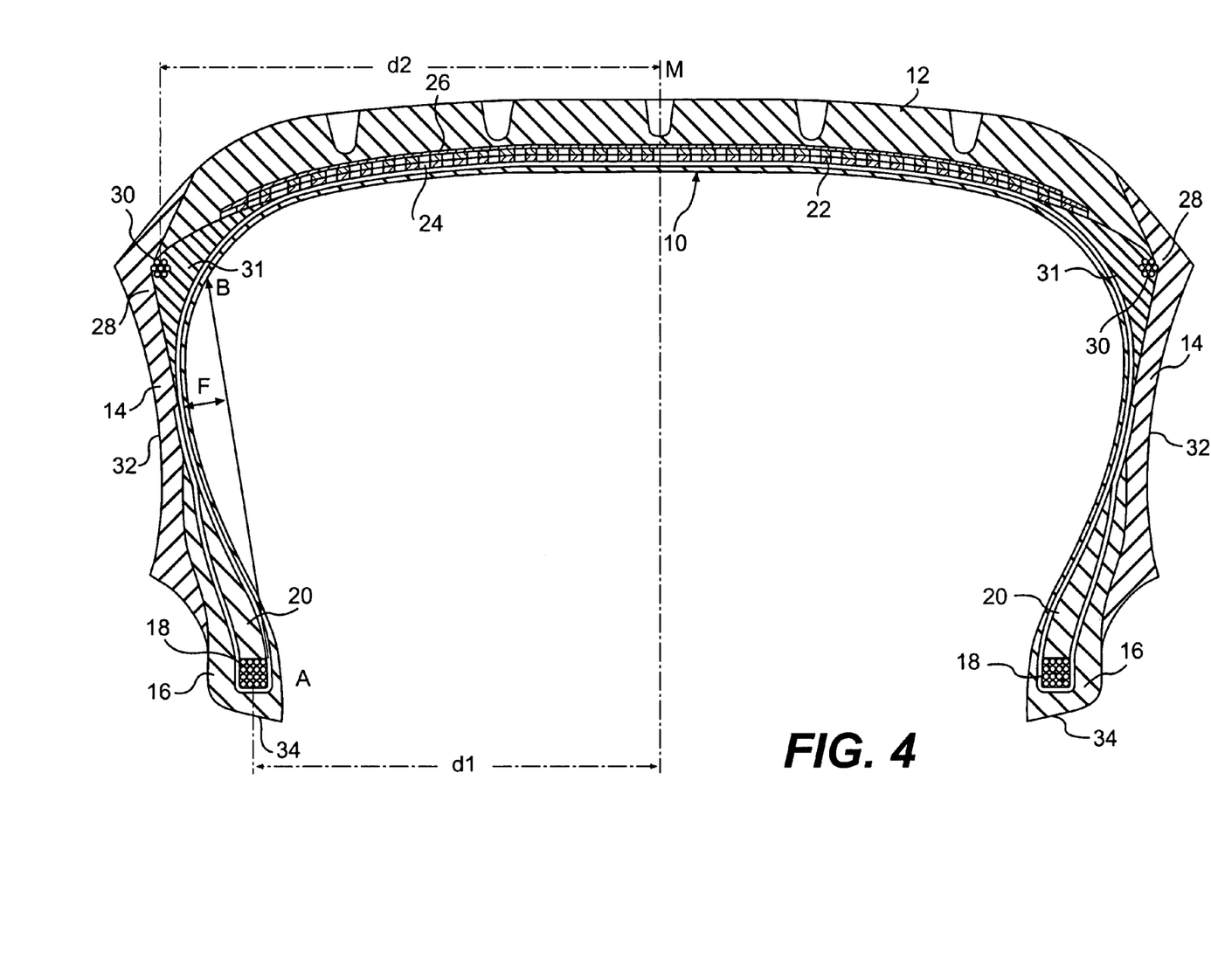
FIG. 4 is a view similar to that of FIG. 3, in which the critical geometrical parameters of the invention are shown.

From FIG. 3 and, in particular, FIG. 4, it can be seen how the curvature of the carcass ply line is slight, so that the camber F of the arc A-B along the inner surface of the carcass between the axially inner edge of the bead core 18 and the intersection of the inner surface of the carcass with the cylindrical surface passing through the geometric center of the two reinforcing elements 30 does not exceed 15% of the length of the said arc A-B.

From FIG. 4, moreover, it can be seen how the distance d2 of the planes in which the geometric center of the two annular reinforcing elements 30 lie, from the equatorial plane M of the tyre, is greater than the distance d1 of the planes passing through the geometric center of the bead cores with respect to the same equatorial plane M.

This distance is preferably such that d2/d1 is greater than about 1.05 and even more preferably such that d2/d1 is greater than about 1.1.

A further important characteristic feature of the tyre shown in FIGS. 3 and 4 is that of the negative curvature of the external surface of the sidewalls (as indicated by the reference number 32): in this way, in fact, it is ensured that the central part of the sidewall is particularly light, although having a thickness which is necessarily large in the zone which houses the annular reinforcing elements 30.

Preferably the tyre also has a rib 34 in the bottom portion of the sidewall, which is designed to rest against the flange of the rim (not shown), the function of said rib being that of improving the lateral stability during flat travel.

Figure 2:
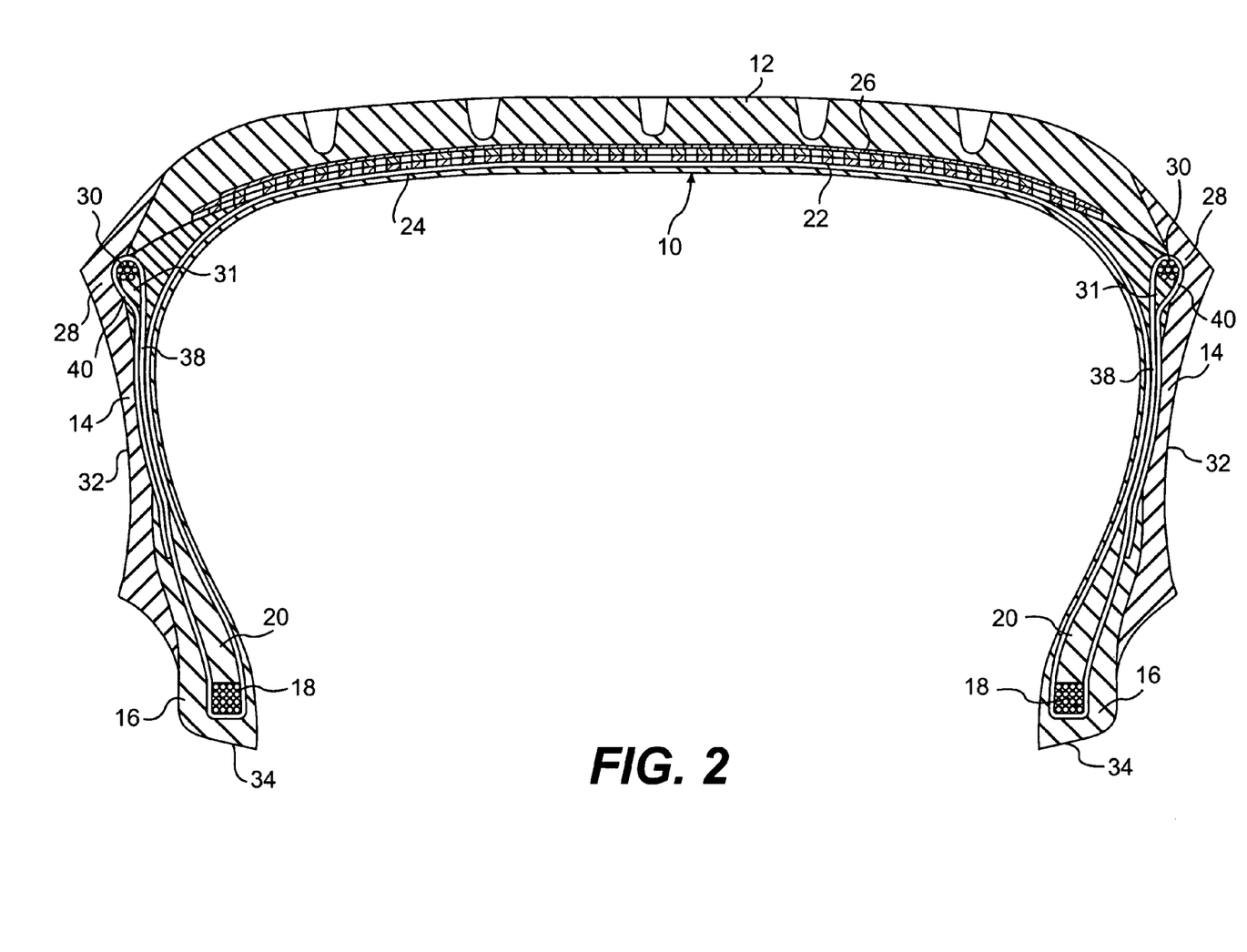

With reference now to FIG. 2, this shows an embodiment which shows again the same structure according to FIG. 3, with the addition of a connection 38 between the annular reinforcing element 30 and the actual bead core 18, said connection consisting in a flipper of preferably radial cords, for example formed with the skirts of the carcass ply. This helps increase the lateral stability and the load-bearing capacity of the tyre during flat travel.

Finally, if we consider the embodiment according to FIG. 1, it is again similar to that of FIG. 3, except for the fact that each reinforcing element 30 is incorporated in a loop 36 of reinforced fabric having cords which are radial or intersecting with respect to the circumferential direction, the loop being inserted between the carcass ply 22 and the end of the belt structure defined by the strips 24. Preferably the radially internal portion 37 of the abovementioned loop extends axially inwards by an amount having a length greater than that of the corresponding portion 39 in a radially external position (not more than 30% of the width of the belt structure).

Figure 1:
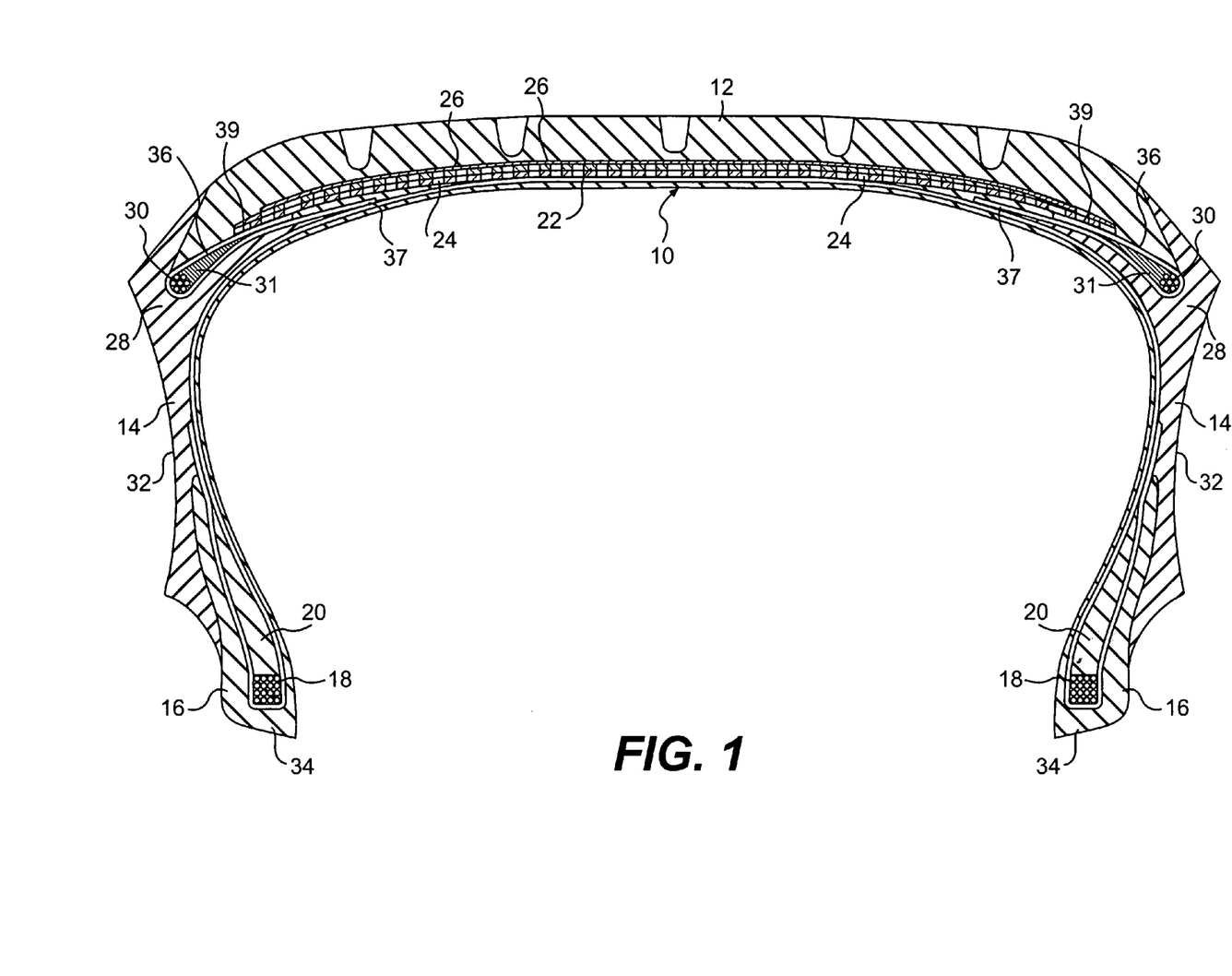
FIGS. 1–3 show partially sectioned views along a plane perpendicular to the middle plane of the tyre.

Alternatively, one of the portions, preferably the portion 37 in a radially internal position extends over the whole axial width of the crown, forming a connection between the two reinforcing elements 30, a connection which in this case also may consist of a ply or layer of rubberised fabric located underneath the belt structure of the tyre and containing metal or textile cords which are inclined with respect to the equatorial plane. In this case also, in order to form this connection, it is possible to use as an alternative one of the belt strips with intersecting cords.

This constructional design, which is particularly suitable for the production of the tyre using a traditional type of machine, has the further advantage of contributing also to the rigidity of the belt, especially if the direction of the cords is not radial but has an angle of about 45°. Folding back the fabric around the reinforcing elements 30—a backfold having a width which is preferably not less than 10% of the width of the tyre belt—produces an intersecting structure which improves the shearing strength of the belt assembly.

As indicated above and as shown in the drawings, the structure of the compression-resistant annular reinforcing element 30 is formed with a wound arrangement of metal wire used for bead cores. Obviously the number of turns which form each element 30 is chosen according to the desired mechanical characteristics with particular reference to the compressive force to be withstood (determined mainly by the weight of the vehicle) and by the dimensions of the tyre.

However, it is possible to envisage using other materials and other structures.

Remaining within the field of metallic materials, equally functional is a wound arrangement of metal strip comprising a layer of rubber compound which is inserted between the turns and adheres to the metal surfaces.

The formulations and the surface treatment for wires and metal strip may be those normally used in the manufacture of tyres. It is also possible to use ordinary adhesives for bonding rubber and metal during vulcanisation.

A class of metallic materials which is particularly suitable for this purpose consists of materials known as superelastic materials, a name which is used to indicate metal alloys, such as Ni—Ti alloys, capable of withstanding great deformations (up to 10%) without them becoming permanent and irreversible.

It is known from the literature that this characteristic is derived from the capacity of these materials to undergo, when in a suitable applied stress state, a phase transition from an austenitic structure to a martensitic structure and vice versa (TW Duerig, K N Melton, D Stockel, "Engineering Aspects of Shape Memory Alloys", C M Wayman Eds., Buttenworth-Heinemann Publishers, 1990).

Within the range of these materials it is possible to use both those which possess a linear superelasticity (ibid., pages 414–419) and those which have a transformation-type superelasticity (ibid., pages 369–393).

The latter include thin metal strip consisting of 50.6 at. % Ni—Ti alloy, while those which possess linear superelasticity include alloys which are cold-worked 49.4 at. % Ni—Ti or 50 at. % Ni—Ti or also 50.8 at. % Ni—Ti (where the compositions refer to percentage of atoms and not percentage in weight).

Alloys which possess linear superelasticity may also include the alloy Cu-25.8 at. % Al-25.5 at. % Be or Cu-25.8 at. % Al-25 at. % Be. The latter, which contains copper, has the further advantage of adhering to rubber having a formulation chosen from among those traditionally used with brass-plated cords, without the need for galvanic coating treatment using brass or other alloys. These alloys are able to recover from deformations in a range varying from 2 to 10% when subjected to applied forces of between 100 MPa and 800 MPa, without undergoing permanent deformation, unlike steel structural elements which, following particularly severe impacts, may be subject to permanent deformations.

By way of a further alternative it is possible to consider composite materials, such as, for example, glass fibres incorporated in an epoxy resin matrix. Particularly suitable is the glass fibre S2, which is characterized by a high ultimate elongation compared to traditional glass fibres for structural use (S) and electrical use (E) ("Handbook of Fiberglass and Advanced Plastics Composites", Van Nostrand Reinhold Company —New York, 1969, 439–444). These composite materials may be in the form of rings, for example obtained by means of winding of pre-impregnated material, metal strip or wound arrangements consisting of rubberised multilayer metal strip.

The invention has been described in relation to preferred embodiments, it being understood that conceptually and mechanically equivalent modifications and variations are possible and may be envisaged without departing from the scope thereof.

What is claimed is:

1. A tyre for a vehicle wheel, capable of withstanding a load applied on the wheel by the vehicle at low pressure or zero pressure, comprising:
   a carcass;
   a crown;
   two axially opposed sidewalls;
   two bead cores;
   two compression-resistant annular reinforcing elements; and
   optionally, a belt structure;
   wherein the crown comprises a tread band,
   wherein the crown is radially external to the carcass,
   wherein each bead core is near a respective radially inner end of the carcass,
   wherein the belt structure, if present, is between the carcass and the tread band,
   wherein the annular reinforcing elements are made of material having high rigidity and very low elastic hysteresis,
   wherein each annular reinforcing element is in or adjacent to a zone joining the crown to a respective sidewall,
   wherein a geometric center of each annular reinforcing element is in a respective first plane parallel to an equatorial plane of the tyre,
   wherein a geometric center of each bead core is in a respective second plane parallel to the equatorial plane of the tyre,
   wherein a first distance between the first planes is greater than or equal to a second distance between the second planes,
   wherein a camber of an arc along an inner surface of the carcass between an axially inner edge of a respective bead core and an intersection of the inner surface of the carcass with a cylindrical surface passing through the geometric center of the two reinforcing elements does not exceed 15% of a length of the arc, and
   wherein the tyre comprises an aspect ratio greater than or equal to 0.3 and less than or equal to 0.7.

2. The tyre of claim 1, wherein the annular reinforcing elements comprise metallic materials, structural composite materials, or metallic materials and structural composite materials.

3. The tyre of claim 2, wherein each annular reinforcing element is operatively connected to a corresponding bead core by an element comprising cords of the carcass.

4. The tyre of claim 1, wherein the annular reinforcing elements are operatively connected together by a layer of rubberized fabric between the carcass and the tread band.

5. The tyre of claim 1, wherein the annular reinforcing elements comprise one or more metal wires.

6. The tyre of claim 1, wherein the annular reinforcing elements comprise a wound arrangement of metal wires.

7. The tyre of claim 1, wherein each annular reinforcing element comprises a wound arrangement of metal strip.

8. The tyre of claim 1, wherein each annular reinforcing element comprises glass fibers incorporated in an epoxy resin matrix.

9. The tyre of claim 1, wherein each sidewall comprises a concave outer surface.

10. The tyre of claim 1, wherein a shoulder insert is associated with each annular reinforcing element.

11. The tyre of claim 10, wherein each shoulder insert is formed as one piece with the corresponding annular reinforcing element.

12. The tyre of claim 1, wherein a ratio of the first distance to the second distance is greater than 1.0:1.

13. The tyre of claim 1, wherein a ratio of the first distance to the second distance is greater than about 1.05:1.

14. The tyre of claim 1, wherein a ratio of the first distance to the second distance is greater than about 1.1:1.

15. A tyre for a vehicle wheel, capable of withstanding a load applied on the wheel by the vehicle at low pressure or zero pressure, comprising:
    a carcass;
    a crown;
    two axially opposed sidewalls;
    two bead cores;
    two compression-resistant annular reinforcing elements; and
    a belt structure;
    wherein the crown comprises a tread band,
    wherein the crown is radially external to the carcass,
    wherein each bead core is near a respective radially inner end of the carcass,
    wherein the belt structure is between the carcass and the tread band,
    wherein the annular reinforcing elements are made of material having high rigidity and very low elastic hysteresis,
    wherein each annular reinforcing element is in or adjacent to a zone joining the crown to a respective sidewall,
    wherein a geometric center of each annular reinforcing element is in a respective first plane parallel to an equatorial plane of the tyre,
    wherein a geometric center of each bead core is in a respective second plane parallel to the equatorial plane of the tyre,
    wherein a first distance between the first planes is greater than or equal to a second distance between the second planes,
    wherein a camber of an arc along an inner surface of the carcass between an axially inner edge of a respective bead core and an intersection of the inner surface of the carcass with a cylindrical surface passing through the geometric center of the two reinforcing elements does not exceed 15% of a length of the arc,
    wherein the annular reinforcing elements are operatively connected together by a layer of rubberized fabric under a belt of the belt structure, and wherein the tyre comprises an aspect ratio greater than or equal to 0.3 and less than or equal to 0.7.

16. A tyre for a vehicle wheel, capable of withstanding a load applied on the wheel by the vehicle at low pressure or zero pressure, comprising:
   a carcass;
   a crown;
   two axially opposed sidewalls;
   two bead cores;
   two compression-resistant annular reinforcing elements; and
   a belt structure;
   wherein the crown comprises a tread band,
   wherein the crown is radially external to the carcass,
   wherein each bead core is near a respective radially inner end of the carcass,
   wherein the belt structure is between the carcass and the tread band,
   wherein the annular reinforcing elements are made of material having high rigidity and very low elastic hysteresis,
   wherein each annular reinforcing element is in or adjacent to a zone joining the crown to a respective sidewall,
   wherein a geometric center of each annular reinforcing element is in a respective first plane parallel to an equatorial plane of the tyre,
   wherein a geometric center of each bead core is in a respective second plane parallel to the equatorial plane of the tyre,
   wherein a first distance between the first planes is greater than or equal to a second distance between the second planes,
   wherein a camber of an arc along an inner surface of the carcass between an axially inner edge of a respective bead core and an intersection of the inner surface of the carcass with a cylindrical surface passing through the geometric center of the two reinforcing elements does not exceed 15% of a length of the arc,
   wherein the annular reinforcing elements are operatively connected together by a layer of rubberized fabric forming at least part of the belt structure, and
   wherein the tyre comprises an aspect ratio greater than or equal to 0.3 and less than or equal to 0.7.

17. A four-wheeled vehicle tyre, capable of withstanding a load applied on a corresponding wheel by the vehicle at low pressure or zero pressure, comprising:
   a carcass;
   a crown;
   two axially opposed sidewalls;
   two bead cores;
   two compression-resistant annular reinforcing elements; and
   optionally, a belt structure;
   wherein the crown comprises a tread band,
   wherein the crown is radially external to the carcass,
   wherein each bead core is near a respective radially inner end of the carcass,
   wherein the belt structure, if present, is between the carcass and the tread band,
   wherein the annular reinforcing elements are made of material having high rigidity and very low elastic hysteresis,
   wherein each annular reinforcing element is in or adjacent to a zone joining the crown to a respective sidewall,
   wherein a geometric center of each annular reinforcing element is in a respective first plane parallel to an equatorial plane of the tyre,
   wherein a geometric center of each bead core is in a respective second plane parallel to the equatorial plane of the tyre,
   wherein a first distance between the first planes is greater than or equal to a second distance between the second planes,
   wherein a camber of an arc along an inner surface of the carcass between an axially inner edge of a respective bead core and an intersection of the inner surface of the carcass with a cylindrical surface passing through the geometric center of the two reinforcing elements does not exceed 15% of a length of the arc and
   wherein the tyre comprises an aspect ratio greater than or equal to 0.3 and less than or equal to 0.7.

* * * * *

UNITED STATES PATENT AND TRADEMARK OFFICE
CERTIFICATE OF CORRECTION

PATENT NO. : 6,938,657 B1
DATED : September 6, 2005
INVENTOR(S) : Gian Carlo Cucco et al.

It is certified that error appears in the above-identified patent and that said Letters Patent is hereby corrected as shown below:

Column 8,
Line 1, "claim 2," should read -- claim 1, --.

Column 10,
Line 39, "arc and" should read -- arc, and --.

Signed and Sealed this

Twenty-first Day of March, 2006

JON W. DUDAS
*Director of the United States Patent and Trademark Office*